United States Patent

Harris et al.

[11] Patent Number: 5,288,828
[45] Date of Patent: Feb. 22, 1994

[54] DISPERSANT POLYMERS

[75] Inventors: Rodney M. Harris, Chicago; Maqsood S. Ahmed, Homewood; Thomas A. Renner, Lansing, all of Ill.

[73] Assignee: The Sherwin-Williams Company, Cleveland, Ohio

[21] Appl. No.: 28,039

[22] Filed: Mar. 8, 1993

[51] Int. Cl.⁵ .............................. C08F 20/26
[52] U.S. Cl. ................... 526/320; 526/292.6; 526/323.1; 526/266; 526/329
[58] Field of Search ............... 526/320, 292.6, 323.1, 526/266, 329

[56] References Cited

U.S. PATENT DOCUMENTS

| | | | |
|---|---|---|---|
| Re. 31,309 | 7/1983 | Antonelli et al. | 523/459 |
| 4,060,511 | 11/1977 | Sinclair et al. | 260/34.2 |
| 4,102,843 | 7/1978 | Sperry et al. | 260/29.6 |
| 4,242,243 | 12/1980 | Antonelli et al. | 260/23 |
| 4,302,560 | 11/1981 | Becher et al. | 525/327 |
| 4,302,561 | 11/1981 | Becher et al. | 525/327 |
| 4,302,562 | 11/1981 | Becher et al. | 525/327 |
| 4,303,764 | 12/1981 | Becher et al. | 525/327 |
| 4,339,365 | 7/1982 | Becher et al. | 523/400 |
| 4,434,268 | 2/1984 | Doroszkowsky et al. | 524/520 |
| 4,578,418 | 3/1986 | Krueger | 524/400 |
| 4,758,642 | 7/1988 | Yezrielev et al. | 526/320 |
| 4,797,444 | 1/1989 | Cowles et al. | 524/501 |
| 4,882,003 | 11/1989 | Bugg et al. | 156/315 |
| 5,106,881 | 4/1992 | Inoue et al. | 521/54 |

FOREIGN PATENT DOCUMENTS

| | | | |
|---|---|---|---|
| 0242754 | 10/1987 | European Pat. Off. | C09D 17/00 |
| 55-69606 | 5/1980 | Japan | 526/320 |
| 57-43585 | 9/1982 | Japan | 526/320 |
| 1145564 | 3/1969 | United Kingdom | 526/320 |
| 1278572 | 6/1972 | United Kingdom | 526/320 |
| 2152947 | 8/1985 | United Kingdom | 526/320 |
| 9000570 | 1/1990 | World Int. Prop. O. | 526/320 |

OTHER PUBLICATIONS

*Paste Concentrate* per Prodotti Vernicianti Industriali (Quednau, et al) Pitture e Vernici, 1989, 65 (9) pp. 77–82.
*Use Of A-B Block Polymers As Dispersants For Non-Aqueous Coating Systems*, Henry L. Jakubauskas, E.I. du Pont de Nemours & Co., Inc., pp. 71–82.

Primary Examiner—Joseph L. Schofer
Assistant Examiner—N. Sarofim
Attorney, Agent, or Firm—Robert E. McDonald; Steven W. Tan; Heidi A. Boehlefeld

[57] ABSTRACT

A hydroxy-functional polymeric dispersant which is substantially free of acid groups, amine groups, and ethylenic unsaturation, the dispersant being especially adapted for dispersing pigments therein and being compatible with a variety of film-forming polymers, said dispersant being the free radical addition polymerization reaction product of a mixture of monomers consisting essentially of:

(a) 15–30% by weight styrene; and
(b) 15–30% by weight of at least one alkyl methacrylate monomer having 1 to 16 carbon atoms in the alkyl group; and
(c) 20–60% by weight of at least one alkyl acrylate monomer having 1 to 16 carbon atoms in the alkyl group; and
(d) 7–25% by weight of at least one hydroxy-functional ethylenically unsaturated monomer copolymerizable with monomers (a) (b) and (c);

wherein said polymeric dispersant has a weight average molecular weight of 18,000 to 24,000, a number average molecular weight of 4,500 to 7,400, and a polydispersity of 2.9 to 4.2.

3 Claims, No Drawings

DISPERSANT POLYMERS

BACKGROUND OF THE INVENTION

1. Field of the Invention

This invention involves a novel polymeric dispersant and pigment dispersions and curable compositions incorporating the dispersant. The dispersant is especially adapted for dispersing pigments therein and it is compatible with a wide variety of film-forming polymers. Due to the unique composition and molecular weight distribution of the polymeric dispersants, they are especially suited for use in high solid coating compositions.

2. Description of the Prior Art

Polymeric dispersants have been known in the art. For example, U.S. Pat. No. 4,242,243 teaches high solids ambient curing coatings utilizing an acrylic/fatty acid drying oil resin as a polymeric dispersant. U.S. Pat. Nos. 4,302,560; 4,302,561; 4,302,562; 4,303,764; and 4,339,365 teach polymeric dispersants having acid groups and amine groups and a weight average molecular weight less than about 10,000. Ionic groups, such as acid or amine groups, can, in some situations, lead to undesirably high viscosities. Additionally, ionic groups can have adverse effects upon some aspects of coating performance by imparting water sensitivity to the dried or cured film. Ethylenic unsaturation can sometimes lead to poorer durability.

BRIEF SUMMARY OF THE INVENTION

This invention involves hydroxy functional polymeric dispersants which are substantially free of ethylenic unsaturation, and also free of ionic groups such as acid groups, or primary, secondary, tertiary or quaternary amine groups. The polymeric dispersants are particularly useful due to their composition and molecular weight distribution and polydispersity requirements. The polymers provide excellent pigment wetting characteristics and stable dispersions, apparently due to the dispersant polymer's relatively high weight average molecular weight. The polymers also provide low viscosity dispersions suitable for use in high solids applications, apparently due to the polymer's relatively low number average molecular weight and freedom from ionic groups.

A particularly preferred use of the dispersants of this invention involves the preparation of pigment dispersions which are suitable for dispersing pigments into a composition containing a film-forming polymer. During coating manufacture, it is typical to disperse the pigments into only a portion of the total resin vehicle of which the coating composition is comprised, together with appropriate liquid carriers and additives. The resulting dispersion is then mixed with the remainder of the total resin vehicle used in the coating composition. These additions can take place by the ultimate user of the coating composition to adjust color, or they may be used during the actual manufacture of the coating composition itself. The pigment dispersions of this invention are especially suitable for admixing with other film-forming resins such as acrylic polymers, polyester polymers, polyurethane polymers, and others.

As used herein, the term "film-forming polymer" means any polymeric material that can form a film from evaporation of any carrier or solvent.

Accordingly, one object of this invention is to provide a novel polymeric dispersant and pigment dispersions prepared therefrom. Another object is to provide coating compositions comprising pigments, the polymeric dispersant, and active hydrogen containing film-forming polymers, optionally in combination with a crosslinker. Another object of this invention is to provide improved high solid coating compositions. Another object of this invention is to provide stable, low viscosity pigment dispersions. These and other objects of this invention will become apparent from the following discussions.

DETAILED DESCRIPTION OF THE INVENTION

A hydroxy-functional polymeric dispersant which is substantially free of acid-groups, amine groups, and ethylenic unsaturation, is prepared as the free radical addition polymerization reaction product of a mixture of monomers consisting essentially of:

(a) 15–30% by weight styrene; and
(b) 15–30% by weight of at least one alkyl methacrylate monomer having 1 to 16 carbon atoms in the alkyl group; and
(c) 20–60% by weight of at least one alkyl acrylate monomer having 1 to 16 carbon atoms in the alkyl group; and
(d) 7–25% by weight of at least one hydroxy-functional ethylenically unsaturated monomer copolymerizable with monomers (a) (b) and (c);

wherein said polymeric dispersant has a weight average molecular weight of 17,000 to 24,000, a number average molecular weight of 4,500 to 7,400, and a polydispersity of about 2.9 to 4.2. An especially preferred polymeric dispersant has a weight average molecular weight of 19,500 to 22,500, a number average molecular weight of 5,000 to 6,200, and a polydispersity of 3.3 to about 4.0. The molecular weights are determined by gel permeation chromatography utilizing polystyrene as the standard as is well known in the industry. Although it is not our intent to be bound by theory, it appears that the absence of ionic groups, and the number average molecular weight limit helps maintain a relatively low viscosity of the polymeric dispersant by itself and also when it is utilized in combination with pigment, while the relatively high weight average molecular weight and corresponding polydispersity provide a sufficient amount of relatively high molecular weight material to provide excellent pigment wetting and stable pigment dispersions.

As used herein, the term styrene is meant to include styrene and the substituted sytrenes e.g., alpha-methylstyrene, vinyl toluene, chlorostyrene, and t-butylstyrene.

The alkyl methacrylate monomers which are useful in the practice of this invention are typically obtained by the reaction of methacrylic acid and monofunctional alcohols. Representative useful methacrylic monomers include methyl methacrylate, ethyl methacrylate, tert-butyl methacrylate, butyl methacrylate, isobutyl methacrylate, propyl methacrylate, isobornyl methacrylate, lauryl methacrylate, 2-ethylhexyl methacrylate, etc.

Representative useful alkyl acrylate monomers are typically prepared by the reaction of acrylic acid and monofunctional alcohols. Representative useful monomers include methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate.

Representative hydroxy-functional ethylenically unsaturated monomers which are copolymerizable with the other required monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, caprolactone adducts with 1 to 5 caprolactone units, such as Tone® M100 (trademark of Union Carbide's hydroxy-functional acrylic caprolactone adduct believed to be the reaction product of 1 mole of hydroxy ethyl acrylate and 2 moles of caprolactone), para vinyl benzyl alcohol, etc.

Especially preferred in the practice of this invention is the use of styrene, methyl methacrylate, butyl acrylate and hydroxyethyl acrylate.

The polymeric dispersant is prepared by polymerizing the monomers under free radical addition polymerization conditions. These conditions typically involve the gradual addition, frequently over a period of several hours, of a mixture of unreacted monomers and free radical initiators into a solvent solution which is generally maintained at a reaction temperatures typically ranging from 75° to 200° C. The reaction mixture is typically "chased" after all the monomer has been added by the addition of additional free radical initiator to ensure more complete polymerization. Suitable polymers can be prepared by conducting the reaction in the presence of a high boiling ester, such as n-butyl propionate at temperatures of 120° to about 145° C. in the presence of suitable initiators such as t-butyl perbenzoate or especially t-butyl peroctoate.

In order to obtain the desired weight average molecular weight, number average molecular weight and polydispersity, with good batch to batch reproducibility, however, it is preferred to alter some of the typical reaction conditions. In addition to the single stage process described above, polymers having the desired molecular weight and polydispersity characteristics can be prepared in a variety of ways. In one process, two or more free radical addition polymerization products can be prepared using a single process such as that described above, each having a characteristic number average molecular weight and weight average molecular weight. These polymers can subsequently be physically combined to provide a mixture having the desired weight average molecular weight, number average molecular weight and polydispersity.

A third convenient process for preparing the polymeric dispersants having the desired molecular weight characteristics involves conducting the polymerization reaction at a relatively constant reaction temperature while altering the initiator concentration over the course of the total monomer feed to provide a greater initiator concentration during some of the reaction period. Free radical addition polymers are typically prepared by slowly adding a mixture of unreacted monomers and initiator into a heated vessel. It is generally understood that lower initiator concentrations yield polymers having higher molecular weights. By conducting the initial stage of the reaction, e.g the first one-fourth to three-fourths, and especially one half to about two thirds, of the total monomer feed time, at an initiator level of 0.5 to about 10 percent based upon the total monomer solids, and having the remaining monomer mixture incorporate a lesser initiator level, for example about 25 to about 75 percent of the initiator concentration initially used, dispersant polymers having the desired molecular weight ranges and polydispersity can be obtained. Alternatively, the low concentration of initiator can be used during the initial stage of the reaction followed by a level 1.3 to about 4 times higher during the later stages.

An additional method which is useful to prepare the polymeric dispersants having the required molecular weight characteristics is by varying the reaction temperature during the monomer feed. In this process, after about one-fourth to about three-fourths, and especially one-half to two-thirds of the monomer mixture has been added to the reaction vessel while the reaction temperature was maintained at a relatively high temperature, e.g. 120°–145° C., the remainder of the monomer addition and reaction will then be conducted at a lower reaction temperature of e.g. 90° to about 115° C. The lower temperature processing will generally provide resin fractions of higher molecular weight. As the temperature range difference is increased, broader molecular weight resins are generally obtained.

Useful free radical initiators well known in the art include azobis(isobutyronitrile), dipropyl peroxide, di-t-butyl peroxide, cumene hydroperoxide, t-butyl perbenzoate, t butyl peroctoate and many others. Especially preferred initiators are t-butyl perbenzoate and, particularly, t-butyl peroctoate. The total amount of initiator used throughout the reaction will typically be from 0.5 to about 10 percent, and especially 2 to about 5 percent by weight of the total monomer charge.

The dispersant polymers are especially suitable for preparing pigment dispersions by conventional dispersion techniques well known in the art such as roller mills, ball mills, Cowles dissolver, sand mills and others. Typically the pigment will be added to the dispersant resin normally, in the presence of a suitable liquid carrier, which may be a solvent, a reactive diluent or even another polymer so that the pigment dispersion has an appropriate viscosity for grinding and dispersing the pigment and maintaining it in a stable dispersed state. A particularly preferred pigment dispersion would comprise:

(i) 1 to about 80 percent by weight pigment;
(ii) 10 to about 60 percent by weight of the hydroxy functional polymeric dispersant; and
(iii) the remainder being a suitable liquid carrier Representative pigments include white pigments such as titanium dioxide, zinc oxide, antimony oxide, etc and also include organic or inorganic chromatic pigments such as iron oxide, carbon black, phthalocyanine blue, quinacridone red, perylene violet, etc. The dispersions may also contain extender pigments such as calcium carbonate, barytes, clay, silica, talc, etc. The dispersions may also contain wetting agents, flow agents, or other additives known in the art. The liquid carrier will typically be a solvent and/or reactive diluent. Suitable solvents include oxygenated solvents such as esters, ketones, ethers and other materials. Oxygenated solvents such as esters are especially preferred due to their favorable solubility characteristics and compliance with many air pollution restrictions. n-Butyl propionate is an especially preferred ester solvent. Suitable reactive diluents include oxazolidines, polyamines, ketimenes, orthoesters, and polyols which would be reactive with any incorporated crosslinking agents.

In order to form a useful coating composition, the pigment dispersion comprising the combination of pigment, the polymeric dispersant and the liquid carrier will typically be combined with an active hydrogen containing film-forming polymer and optionally a crosslinker which is reactive with both the dispersant and the active hydrogen-functional film-forming polymer. By "active hydrogen" is meant those reactive groups as determined by the Zerewitinoff Method as described by Kohler in *J. Am. Chem. Soc.* 49, 3181 (1927). Representative active hydrogen containing groups include —OH, —COOH, —SH, —NH, etc. Particularly preferred coating compositions are those incorporating hydroxy-functional or amine functional film forming polymers. Representative hydroxy functional film-forming polymers include polyether polyols such as those prepared by the reaction of a diol or polyol with the corresponding alkylene oxide. Another useful class of hydroxyfunctional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil or non-drying oil fatty acids. By adjusting the stoichiometry of the alcohols and the acids while maintaining an excess of hydroxyl groups, hydroxy-functional polyesters can be readily prepared.

Additionally, hydroxy-functional polymers can be prepared by the ring opening reaction of epoxides and/or polyepoxides with primary or, preferably, secondary amines or polyamines to produce hydroxy-functional polymers. Other useful hydroxy-functional polymers can be prepared by the reaction of an excess of at least one polyol with polyisocyanates to produce hydroxy-functional urethanes.

Other useful hydroxy-functional polymers can be prepared by free radical polymerization techniques such as in the production of acrylic resins wherein at least one of the monomers will contain, or can be reacted to produce, a reactive hydroxyl group. Additionally, amine-functional compounds can be utilized as the active hydrogen-functional polymer. Polyamines can be prepared by methods well known in the art such as by the free radical polymerization of acrylic or other unsaturated monomers having primary or secondary amine functionality or by the reaction of amines having at least two amine groups per molecule with a polycarboxylic acid to form polyamide amines, or by the reaction of primary amines with epoxy materials to produce secondary amine and hydroxyl functionality.

The coating compositions will typically also incorporate a crosslinking agent which is reactive with the polymeric dispersant and the active hydrogen-functional polymer. Typical crosslinking agents include polyanhydrides, polyisocyanates, which may be blocked, and amino resins such as a condensate of an aldehyde, such as formaldehyde, with a nitrogenous compound such as urea, melamine or benzoguanamine or a lower alkyl ether of such a condensate. The coating compositions can also contain solvents, reactive diluents, flow agents, ultra-violet light absorbers, catalysts, etc. The coating compositions could typically be applied to any substrate such as metal, plastic, wood, glass, synthetic fibers, etc. by brushing, dipping, roll coating, flow coating, spraying or other method conventionally employed in the coating industry. The curable coatings can typically be cured at temperatures ranging from about room temperature to about 300° F. for polyisocyanate and polyanhydride crosslinked materials, and at temperatures ranging from about 200° to about 350° F. for amino resin crosslinked materials.

The following examples have been selected to illustrate specific embodiments and practices of advantage to a more complete understanding of the invention. Unless otherwise stated, "parts" means parts by weight and "percent" is percent-by-weight. Unless otherwise indicated, the ability of the dispersant to provide a stable, compatible pigment dispersion is determined by a "finger rub up test". Under this test still wet coating films are rubbed with the forefinger. Any lightening or separation of color is noted. A noticeable change in color between the rubbed portion of the wet film and the unrubbed portion is an indication of a dispersion which is unstable or incompatible. The rub up results are rated on a scale of 1 to 10 with 1 being no change in color and 10 being a very significant change. Ratings of about 3.5 or less are generally considered acceptable.

EXAMPLE 1

Twelve hundred parts of n-butyl propionate was charged to a polymerization reactor, fitted with a mechanical stirrer, a water cooled condenser, a nitrogen inlet, a thermometer, a heating mantle, and a fluid metering pump. The solvent was heated to 135° C. Next, a monomer/initiator mixture of 214.67 parts styrene, 214.67 parts methyl methacrylate, 364 parts butyl acrylate, 140 parts hydroxy ethyl acrylate and 72.3 parts t-butyl peroctoate was metered into the reaction vessel at a constant rate over a one hour time period. A second monomer/initiator addition comprising a mixture of 429.33 parts styrene, 429.33 parts methyl methacrylate, 728 parts butyl acrylate, 280 parts hydroxy ethyl acrylate and 36 parts t-butyl peroctoate was then metered into the reaction vessel at a constant rate over a time period of approximately two hours. The reaction temperature was held at 135° C. for 15 minutes after completing the second monomer addition. Next, 8.4 parts t-butyl perbenzoate was added over a five minute time period. The reaction was held at 135° C. for a 30 minute time period. Another 8.4 parts t-butyl perbenzoate was added over a five minute time period. The reaction was then held at 135° C. for an additional 60 minutes.

The reaction mixture was allowed to cool to room temperature which yielded a hydroxy-functional polymer with a number average molecular weight of 5530, a weight average molecular weight of 19531 and a polydispersity of 3.53. The theoretical hydroxyl equivalent weight was calculated to be 773.3. The percent nonvolatile solids was 69.5% (@225° F. for 1 hour). Viscosities were Brookfield of 55.5 ps (#4 spindle ®20 RPM), and Gardner Holdt of 45 stokes. Gardner Holdt color and clarity were 0–1 and clear. The weight per gallon was 8.60 lbs.

A white pigment dispersion was prepared by dispersing 1140.83 parts rutile titanium dioxide in 8.84 parts 2-butoxyethyl acetate, 8.65 parts toluene and 388.26 parts of the dispersant of Example 1 on a high speed disperser until a 7H grind is obtained. An additional 88 parts of the dispersant of Example 1 and 173.99 parts of methyl ethyl ketone are then added to stabilize the mixture.

A blue dispersion is prepared by grinding 106.54 parts phthalocyanine blue pigment into a mixture containing 61.65 parts of the dispersant of Example 1, 60.77 parts toluene, 106.53 parts butyl acetate, and 16.51 parts Disperbyk ™ 182 pigment dispersant. The mixture is dispersed on a high speed disperser followed by a horizontal continuous mill to obtain a grind of 7H. Once the pigment has been dispersed, the mixture is stabilized by the addition of 543.87 parts of the dispersant of Example 1 and 56.39 parts methyl ethyl ketone.

A black dispersion was prepared by charging a ball mill with 446.39 parts of the dispersant of Example 1, 35.79 parts xylene, 122.24 parts methyl isobutyl ketone and 58.54 parts carbon black pigment. The mixture is ground in the ball mill until a grind of 7H is obtained and the mixture is then stabilized by the addition of 177.95 parts of the dispersant of Example 1 and 50 parts methyl ethyl ketone.

In order to determine the effectiveness of the dispersant resin, the black and blue dispersions were admixed with the white pigment dispersion according to the following formula:

10 parts blue or black dispersion, 45 parts white dispersion. 40 parts V2V1215 (commercially available hydroxy-functional mixing clear vehicle from The Sherwin-Williams Company), 25 parts R7K6204 (commercially available solvent mixture from The Sherwin-Williams Company) and 50 parts of V6V1250 (commercially available polyisocyanate crosslinker from The Sherwin-Williams Company). The blue/white mixtures also received a small amount of Byk TM 300 and FC TM 430 flow agents.

The paints were sprayed onto panels primed with Sherwin-Williams JET-SEAL ® primer and the wet paint was then rubbed to evaluate the stability of the dispersion. The blue/white dispersions made using the dispersant of Example 1 had a rating of 2 and the black/white dispersion had a rating of 2. A variation of the dispersant of Example 1 was prepared having a number average molecular weight of 4181, a weight average molecular weight of 11288 and a polydispersity of 2.7. This variation, when tested in the same manner had a rating of 4 for the blue/white dispersion and a rating of 10 for the black/white dispersion. Variations of the dispersant of Example 1 having a number average molecular weight of 6356, a weight average of 20083 and a polydispersity of 3.16 or having a number average molecular weight of 5530, a weight average of 19531 and a polydispersity of 3.53 showed acceptable blue/white and black/white ratings.

EXAMPLE 2

The same reaction set-up as used for Example 1 was charged with 720 parts n-butyl propionate and heated to 135° C. under nitrogen. A monomer/initiator mixture of 386.4 parts styrene, 836.4 parts methyl methacrylate, 655.2 parts butyl acrylate, 252 parts hydroxyethyl acrylate and 84 parts t-butyl perbenzoate was metered into the reaction vessel at a constant rate over a three hour time period The reaction temperature was maintained at 135° C. for an additional 15 minutes after the complete monomer addition. Next, 5.0 parts t-butyl perbenzoate was added to the reaction over a five minute time period. The reaction was held for 30 minutes at 135° C. An additional 5.0 parts of t-butyl perbenzoate was added over five minutes. Then the reaction mixture was held for one hour at 135° C. and then allowed to cool to room temperature.

A hydroxy-functional polymer was produced with a number aver age molecular weight of 5300, a weight average molecular weight of 20200 and a polydispersity of 3.8. The theoretical hydroxyl equivalent weight was calculated to be 773.3. The percent nonvolatile weight solids was 70.1% (@225° F. for one hour). Viscosities were Brookfield of 54.5 ps (#4 spindle @20 RPM), and Gardner Holdt of 45 stokes. Gardner Holdt color and clarity were 0–1 and clear. The weight per gallon was 8.64 lbs.

EXAMPLE 3

A polymerization set-up similar to that used in Example 1 was charged with 1200 parts n butyl propionate and heated to 135° C. Next, approximately two-thirds of a monomer/initiator mixture of 644 parts styrene, 644 parts methyl methacrylate, 1092 parts butyl acrylate, 420 parts hydroxyethyl acrylate and 126 parts t-butyl peroctoate was metered into the reaction vessel at a constant rate over a two hour time period. The reaction temperature was then allowed to cool for 30 minutes to 120° C. The monomer/initiator feeds were then continued for an additional hour until all of the monomer/initiator was added. The reaction mixture was maintained at 120° C. after completing the second monomer addition. The reaction temperature was then increased to 135° C. over 15 minutes. Next, 8.4 parts t-butyl perbenzoate was added over a five minute time period and the reaction was maintained at 135° C. for an additional 30 minutes. Another 8.4 parts t-butyl perbenzoate was then added over a five minute time period, and the reaction was then held at 135° C. for an additional 60 minutes.

The reaction mixture was allowed to cool to room temperature which yielded a hydroxy-functional polymer with a number average molecular weight of 5659, a weight average molecular weight of 17069 and a polydispersity of 3.02. The theoretical hydroxyl equivalent weight was calculated to be 773.3. The percent non volatile solids is 69.5% (@225° F for one hour). Viscosities were Brookfield of 48.0 ps (#4 spindle @20 RPM), and Gardner Holdt of 37 stokes. Gardner Holdt color and clarity were 0–1 were clear. The weight per gallon was 8.58 lbs.

EXAMPLE 4

The same reaction set up was used as for Example 1. The reactor was then charged with 781.8 parts n-butyl propionate and heated to 135° C. Next, a monomer/initiator mixture of 418.6 parts styrene, 418.6 parts methyl methacrylate, 709.8 parts butyl acrylate, 273 parts hydroxyethyl acrylate, 65.9 parts n-butyl propionate and 65.9 parts t-butyl peroctoate was metered into the reaction vessel at a constant rate over approximately three hours. A 15 minute hold at 135° C. was then followed by a second monomer/initiator addition comprising a mixture of 225.4 parts styrene, 225.4 parts methyl methacrylate, 382.2 parts butyl acrylate, 147 parts hydroxyethyl acrylate, 78.4 parts n-butyl propionate and 78.4 parts t-butyl peroctoate was metered into the reaction vessel at a constant rate over approximately two hours. The reaction temperature was held at 135° C. for 15 minutes following complete secondary monomer addition. Next, a solution of 8.4 parts t-butyl perbenzoate in 3.6 parts aromatic naphtha was added over five minutes. The reaction was held at 135° C. for 30 minutes. Another 8.4 parts t-butyl perbenzoate in 3.6 parts of aromatic naphtha was added over a five minute time period. The reaction was then held at 135° C. for an additional 60 minutes. Addition of 229.3 parts of n-butyl propionate provided the final non-volatile solids.

The reaction mixture was allowed to cool to room temperature which yielded a hydroxy-functional polymer with a number average molecular weight of 5921, a weight average molecular weight of 19438 and a polydispersity of 3.3. The theoretical hydroxyl equivalent weight was calculated to be 773.3. The percent nonvolatile solids was 70.5% (@300° F. for 30 minutes). Viscosities were Brookfield of 49.6 ps (#4 spindle @20 RPM), and Gardner Holdt of 42 stokes. Gardner Holdt color and clarity were 0–1 and clear. The weight per gallon was 8.56 lbs.

EXAMPLE 5

A polymerization set-up similar to that used for Example 1 was charged with 1200 parts n-butyl propionate and heated to 135° C. under nitrogen. A monomer/initiator mixture of 644 parts styrene, 644 parts methyl methacrylate, 1092 parts butyl acrylate, 420 parts hydroxyethyl acrylate and 72.8 g t-butyl peroctoate was metered into the reaction vessel at a constant rate over a three hour time period. The reaction temperature was maintained at 135° C. for an additional 15 minutes after the complete monomer addition. Next, 8.4 parts t-butyl peroctoate was added to the reaction over a five minute time period. The reaction was held for 30 minutes at 135° C. An additional 8.4 parts of t-butyl peroctoate was added over five minutes. Then the reaction mixture was held for one hour at 135° C. and then allowed to cool to room temperature.

A hydroxy-functional polymer was produced with a number average molecular weight of 6700, a weight average molecular weight of 20000 and a polydispersity of 2.99. The theoretical hydroxyl equivalent weight was calculated to be 773.3. The percent non volatile solids by weight was 69.1% (@225° F. for one hour). Viscosities were Brookfield of 55.0 ps (#4 spindle @20 RPM), and Gardner Holdt of 49 stokes. Gardner Holdt color and clarity were 0–1 and clear. The weight per gallon was 8.59 lbs.

EXAMPLE 6

A hydroxy-functional polymer was prepared by initially charging a polymerization reactor equipped with a mechanical stirrer, a water cooled condenser, a nitrogen inlet, a water trap, a thermometer, heating mantle, and a fluid metering pump, 1200 parts n-butyl propionate and heated to 135° C. under nitrogen. A monomer/initiator mixture of 644 parts styrene, 644 parts methyl methacrylate, 1092 parts butyl acrylate, 420 parts hydroxyethyl acrylate and 217 parts t-butyl peroctoate was metered into the reaction vessel at a constant rate over a three hour time period. The reaction temperature was maintained at 135° C. for an additional 15 minutes after the complete monomer addition. Next, a 8.4 parts t-butyl perbenzoate was added to the reaction over a five minute time period. The reaction was held for 30 minutes at 135° C. An additional 8.4 parts of t-butyl perbenzoate was added over five minutes. Then the reaction mixture was held for one hour at 135° C. and then allowed to cool to room temperature.

A hydroxy-functional polymer was produced with a number average molecular weight of 3950, a weight average molecular weight of 9500 and a polydispersity of 2.41. A theoretical hydroxyl equivalent weight of 773.3 was obtained. The percent non-volatile solids by weight was 69.5% (®225° F. for one hour). Viscosities were Brookfield of 21.8 ps (#4 spindle @20 RPM), and Gardner Holdt of 15 stokes. Gardner Holdt color and clarity were 0–1 and clear. The weight per gallon was 8.56 lbs.

EXAMPLE 7

In like manner to Example 6 a hydroxy-functional polymer was prepared by using the procedure and raw material charge of Example 5 except the initial charge of 217 parts t-butyl peroctoate was reduced to 114.8 parts. The polymer had a number average molecular weight of 5460, a weight average molecular weight of 16000 and a polydispersity of 2.93. The percent nonvolatile by weight was 69.5% (@225° F. for one hour). Viscosities were Brookfield of 49.2 ps (#4 spindle @20 rpm) and Gardner Holdt of 36 stokes. Gardner Holdt color and clarity were 0–1 and clear. The weight per gallon was 8.60 lbs.

EXAMPLE 8

In like manner to Example 6 a hydroxy-functional polymer was prepared by using the procedure and raw material charge of Example 5 except the initial charge of 217 parts t-butyl peroctoate was reduced to 47.6 parts. The polymer had a number average molecular weight of 8300, a weight average molecular weight of 31000 and a polydispersity of 3.73. The percent non volatile by weight was 69.4. Viscosities were Brookfield of 145 ps and Gardner Holdt of 115 stokes. Gardner Holdt color and clarity were 0–1 and clear. The weight per gallon was 8.62 lbs.

EXAMPLE 9

A container was charged with 1459.3 parts of the dispersant of Example 6 (NVM of 69.5%), 829.1 parts of the dispersant of Example 7 (NVM of 69.5%), and 1711.6 parts of the dispersant of Example 8 (NVM of 69.4%). The contents were mixed vigorously with heating to 50° C. under a nitrogen blanket for about 15 to 20 minutes. The polymer mixture had an NVM of 69.7% (225° F. @60 min), a wt/gallon of 8.59 lbs., a Brookfield viscosity of 57.0 ps (#4 spindle @20 RPM), a Gardner Holdt viscosity of 46 stokes, Gardner Holdt Color and Clarity were 0–1 and clear. The number average molecular weight was 5675, the weight average molecular weight was 19864, and the Pd was 3.5.

Blue, white and black pigment dispersions and paints were prepared for each of the dispersants of Examples 2 through 5 and 9 in the same manner set forth in Example 1. All showed acceptable performance. By contrast, similar polymers having molecular weights or polydispersities outside the ranges taught herein showed significantly poorer performance.

While this invention has been described by a specific number of embodiments, other variations and modifications may be made without departing from the spirit and scope of the invention as set forth in the appended claims.

The entire disclosures of all applications, patents, and publications cited herein are hereby incorporated by reference.

The invention claimed is:

1. A hydroxy functional polymeric dispersant which is substantially free of acid groups, amine groups, and ethylenic unsaturation, the dispersant being especially adapted for dispersing pigments therein and being compatible with a variety of film-forming polymers, said dispersant being the free radical addition polymerization reaction product of a mixture of monomers consisting essentially of:

(a) 15–30% by weight styrene; and (b) 15–30% by weight of at least one alkyl methacrylate monomer having 1 to 16 carbon atoms in the alkyl group; and
(c) 20–60% by weight of at least one alkyl acrylate monomer having 1 to 16 carbon atoms in the alkyl group; and
(d) 7–25% by weight of at least one hydroxy-functional ethylenically unsaturated monomer copolymerizable with, monomers (a) (b) and (c);
wherein said polymeric dispersant has a weight average molecular weight of 18,000 to 24,000, a number average molecular weight of 4,500 to 7,400, and a polydispersity of 2.9 to 4.2.

2. The dispersant of claim 1 wherein the weight average molecular weight is 19,500 to 22,500, the number average molecular weight is 5,000 to 6,200 and the polydispersity is 3.3 to 4.0.

3. The dispersant of claim 2 wherein the mixture of monomers consists essentially of styrene, methyl methacrylate, butyl acrylate and hydroxyethyl acrylate.

* * * * *